April 15, 1969   HIDEO WATANABE ET AL   3,438,875
METHOD OF FORMING REFERENCE ELECTRODES
Filed April 14, 1966

HIDEO WATANABE
JOHN N. HARMAN III
INVENTORS

BY Thomas L. Peterson
ATTORNEY

United States Patent Office  3,438,875
Patented Apr. 15, 1969

3,438,875
METHOD OF FORMING REFERENCE ELECTRODES
Hideo Watanabe, Fullerton, and John N. Harman III, La Habra, Calif., assignors to Beckman Instruments, Inc., a corporation of California
Filed Apr. 14, 1966, Ser. No. 542,623
Int. Cl. C23b 11/00
U.S. Cl. 204—56        3 Claims

ABSTRACT OF THE DISCLOSURE

A silver-silver chloride reference electrode for use in control of anodic protection systems or for making ion concentration measurements of halide solutions, particularly sea water. The sea water constitutes the salt bridge solution of the reference electrode. After the silver chloride coating of the electrode erodes away, a constant direct anodic current is applied to the silver element of the electrode until it is completely coated by silver chloride and thus suitable for use as a stable and reliable reference electrode.

---

This invention relates generally to a reference electrode and, more particularly, to an electrochemical reference electrode which may be utilized in connection with ionic concentration measurements of solutions and oxidation-reduction potential measurements for electrochemical corrosion control systems.

A variety of electrochemical reference electrodes are available today for the above applications. These include calomel and silver-silver chloride electrodes in which the calomel or silver-silver chloride internal half cell is positioned in a salt bridge tube having a liquid junction structure therein so that the salt solution in the tube flows through the liquid junction structure providing ionic communication between the internal half cell and the sample solution. This type of reference electrode is fragile, requires the replacement of the salt solution after a relatively short period of time and is unsuitable for use at any appreciable depth in a body of liquid unless the salt bridge solution is pressurized.

In electrochemical corrosion control systems it is necessary to measure the potential difference between the metallic structure to be protected and the surrounding solution, which may be brine water in an industrial process or ocean water when the structure is a pier, ship, etc., to determine if a sacrificial anode is functioning properly. A reference electrode for an anodic protection system generally comprises a silver-silver chloride element mounted in a casing having one or more openings therein to provide flow communication between the silver-silver chloride element and the surrounding water. Consequently, in such a reference electrode, the sample media itself constitutes the salt solution for the electrode. Although such an electrode is rugged and does not require replacement of salt solution, as the silver-silver chloride electrodes discussed above which employ salt bridge tubes, the silver chloride coating on the electrode element dissolves in the surrounding media, thus altering the electrochemical characteristics of the electrode and producing an unstable, unreliable reference voltage.

It is, therefore, the principal object of the present invention to provide an improved reference electrode system and electrode structure which is rugged, requires no replacement of salt solution, and will produce a known, reliable reference voltage.

According to a principal aspect of the present invention, a substantially pure silver element is positioned in a porous housing that is adapted to be submerged in a body of halide solution, such as sea water in which potentials are desired to be measured to determine the ionic concentration of the solution or oxidation-reduction potentials are monitored in connection with an electrochemical corrosion control system for a metallic structure in the solution. It is to be understood that the term "substantially pure silver" means silver which is free of a coating of silver halide. A conductor is connected to the silver element, extends through the housing and is connected to a source of substantially constant direct current, which has one of its leads connected to the metallic structure which is made the cathode of the circuit. Control means are associated with the source of direct current for delivering sufficient anodic current to the silver element to coat the same with silver halide. After the silver element is completely coated by silver halide, as will be evidenced by an abrupt change in the potential difference between the silver anode and the cathode structure, the current flow is terminated and oxidation-reduction potentials or ionic concentrations may be measured. Thus, by the method and system of the present invention, the silver-silver halide coating on the silver element may be renewed periodically to assure that stable, reliable reference voltages are produced by the reference electrode structure. Furthermore, since the silver element is surrounded by a porous housing, movement of the solution in which the electrode is submerged is substantially impeded, thus minimizing the dissolving of the silver-silver halide coating into the solution, thus ensuring that a stable reference voltage is produced.

Other objects, aspects and advantages of the invention will become apparent from the following description taken in connection with the accompanying drawings wherein.

Figure 1:
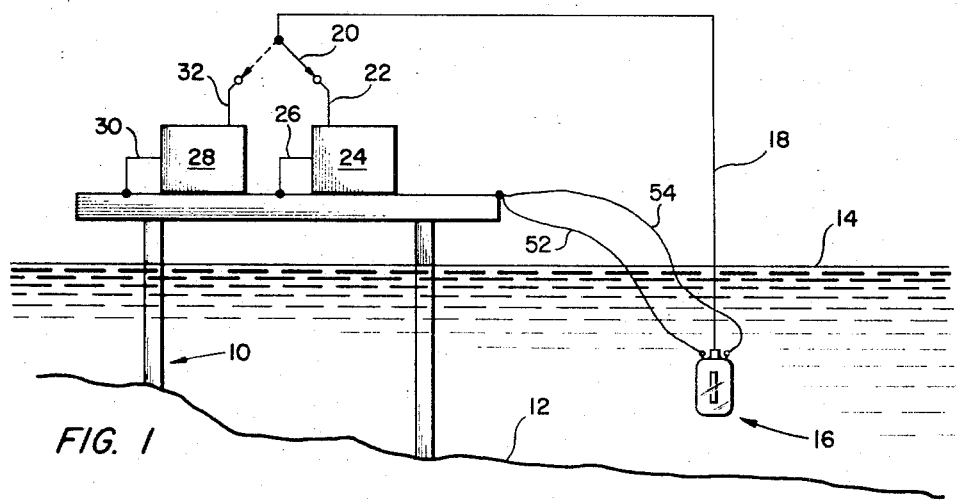
FIG. 1 is a schematic illustration of a system constructed in accordance with this invention.

Referring now to FIG. 1, there is illustrated schematically the reference electrode system of the invention as it would appear if it were desired to make potential measurements in sea water. The system includes a metallic structure 10 supported by the floor 12 of the ocean 14, which constitutes a body of halide solution having a substantially constant concentration of chloride ions. The reference electrode 16 for the system is submerged in the sea water 14 and is connected by an insulated conductor 18, via the switch 20 to the positive (electron consuming) terminal 22 of a source of substantially constant direct current 24. The negative (electron donating) terminal 26 of the power source is connected to the structure 10. Also mounted on this structure, for reasons that will appear later, is a high impedance millivoltmeter or pH meter 28 having one lead 30 connected to the metallic structure 10 and the other lead 32 which may be connected in the circuit with the reference electrode 16 when the switch 20 is in the position shown in the dotted line in FIG. 1.

Figure 2:
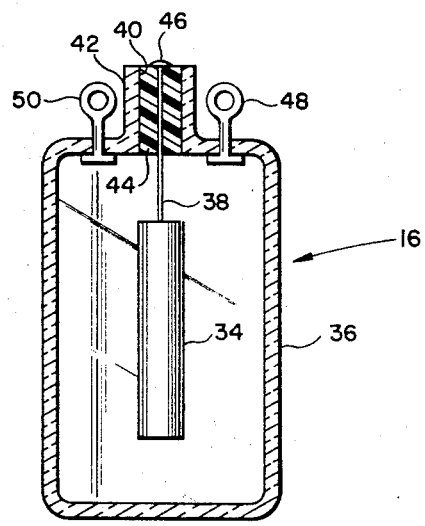
FIG. 2 is a vertical sectional view of the preferred form of the electrode structure of the invention.

Preferably the electrode 16 takes the form of that shown in FIG. 2 in which a substantially pure silver element 34 is centrally positioned in a cylindrical housing 36 formed of a material which is permeable to the sea water. Examples of such permeable materials are porous ceramic, fritted glass and porous plastic. A silver wire 38 is connected to the silver element 34 and passes through an opening 40 in a neck 42 at one end of the housing 36. The wire is sealed into the opening 40 by any appropriate potting material such as an epoxy resin 44. The end of the conductor 38 extending through the opening 40 terminates in a metallic element 46 for contacting the conductor 18 when a watertight plug, not shown, at the end of conductor 18 is suitably positioned on the neck 42 of the housing. Eyelets 48 and 50 formed of nonconductive material are mounted in the housing 36 so that the electrode 16 may be suspended by cable 52 and 54 as seen in FIG. 1 to the metallic structure 18.

Figure 3:
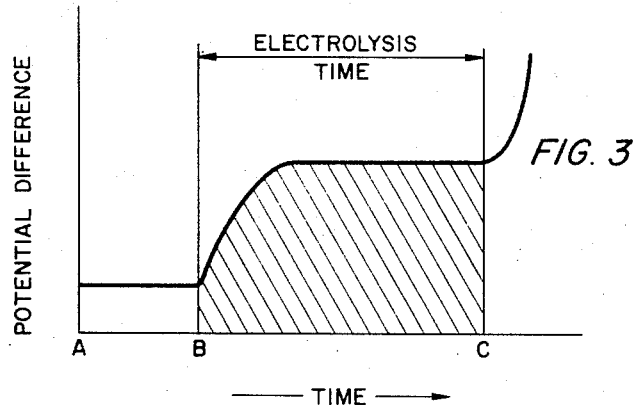
FIG. 3 is a graph illustrating the electrolysis process utilized in forming the silver-silver halide coating on the silver element of the electrode of the invention.

In order to complete the reference electrode structure of the invention, it is necessary for the metallic structure 10 to be connected as the cathode and the silver element 34 of the reference electrode as the anode of the electrolysis system. With the power source 24 so connected to structure 10 and element 34, and the switch 20 in the position as shown in FIG. 1, a substantially constant anodic direct current is delivered to the silver element 34 for a sufficient time to completely cover the element with silver chloride. The time of electrolysis and current density necessary to provide the complete coverage of the silver element 34 with silver chloride may be computed from the geometrical area of the silver element and well known electrochemical theory. Completion of the silver-silver chloride coating process may be monitored by measuring the potential difference between the silver element 34 undergoing oxidation as the anode and the structure 10 by the meter 28 when the switch 20 is in the position shown in dotted lines in FIG. 1. The curve in FIG. 3 shows how the potential difference between the reference electrode 16 and the metallic structure 10 varies with time. Between times A and B no current is delivered to electrode. At time B a constant anodic current is supplied to the silver element 34 at which time the curve will rise abruptly and then level out, as shown, until time C is reached when a second abrupt change in the potential difference occurs at which point the electrolysis should be terminated. At time C, another electrochemical process occurs, resulting in the evolution of oxygen and chlorine gas. The potential difference between the electrolysis cathode 10 and silver anode 34 may be periodically checked during the electrolysis process by movement of the switch 20 to the dotted line position in FIG. 1 to observe when an abrupt change in the potential difference occurs as shown at time C in FIG. 3. After that time, the reference electrode of the invention is then ready for use for measuring the potential differences occurring between the metallic structure 10 and the sea water to determine whether there is sufficient sacrificial anode material, or current from an external D.C. power supply, not shown, associated with the electrochemical corrosion control system for adequate protection of the structure. If it is desired to utilize the reference electrode 16 in connection with measuring the ionic concentration of the sea water, the reference electrode together with a glass electrode or other suitable ion measuring electrode is connected to a high impedance millivoltmeter or pH meter, not shown.

An important feature of the invention is the porous housing 36 for the reference electrode. Without such housing, the movement of ocean water past the element 34 would result in the quick dissolution of the silver chloride coating. By enclosing the element 34 within a porous housing, restricted flow of the water will permit replacement of the sea water for a stable reference voltage during measurements without appreciable dissolution of the silver chloride coating on the element 34. Eventually, however, the silver chloride coating on the element 34 will dissolve appreciably, thus resulting in the reference electrode producing an unstable reference voltage. To rejuvenate the reference electrode for further measurements, the anodic current is again delivered from the source 24 to the silver element 34, in the manner discussed above until the element is again completely coated with silver chloride. Thus, it is seen by the present invention that the reference electrode may be utilized for virtually an unlimited period of time without removing the electrode from the sea water and without being adversely affected by high fluid pressures.

It is to be understood that although the invention has been described in connection with a reference electrode system for use in the ocean, it may also be utilized in industrial processes in which the fluid has a substantially constant halide concentration, such as in bromide, iodide or chloride solutions, in which case the metallic structure 10 would most likely be a container for the solution.

Although only one embodiment of the invention has been disclosed herein for purposes of illustration, it will be understood that various changes can be made in the form, details, arrangement and proportions of the various parts in such embodiment without departing from the spirit and scope of the invention as defined by appended claims.

What is claimed is:

1. A method for forming an electrochemical reference electrode comprising the steps of:

providing a housing of nonconductive material having a portion of the wall of the housing permeable to halide solution, with a silver element positioned in said housing;

submerging said housing in a body of said halide solution having a second metallic structure contacting said body;

connecting a source of direct current to said silver element and said metallic structure;

supplying a substantially constant anodic direct current from said source to said silver element until said element is substantially coated with silver halide;

measuring the potential between the element and the metallic structure; and terminating the anodic direct current supply to said silver element upon an abrupt second change in the potential difference between said element and said metallic structure and thus prior to appreciable evolution of gases at the element.

2. A method as set forth in claim 1 including the further steps of successively supplying substantially constant anodic direct current to said silver element after the silver halide coating on said element dissolves into said body of solution and terminating said anodic direct current upon an abrupt second change in the potential difference between said element and said metallic structure.

3. A method as set forth in claim 1 wherein said halide solution is ocean water.

References Cited

UNITED STATES PATENTS

| | | | |
|---|---|---|---|
| 1,598,018 | 8/1926 | Schlumberger | 204—98 |
| 2,521,082 | 9/1950 | Mullen | 204—56 |
| 2,651,612 | 9/1953 | Haller | 204—195 |
| 2,928,775 | 3/1960 | Leisey | 204—195 |
| 2,977,293 | 3/1961 | Ingold | 204—195 |
| 2,998,371 | 8/1961 | Sabins | 204—196 |
| 3,006,821 | 10/1961 | Haring | 204—56 |
| 3,169,913 | 2/1965 | Wright | 204—260 |
| 3,272,731 | 9/1966 | Hutchison et al. | 204—195 |
| 3,315,270 | 4/1967 | Hersch | 204—1.1 |

JOHN H. MACK, *Primary Examiner.*

T. TUNG, *Assistant Examiner.*

U.S. Cl. X.R.

204—195